US012774054B2

(12) United States Patent
Henderson

(10) Patent No.: US 12,774,054 B2
(45) Date of Patent: Oct. 27, 2026

(54) TWO PERSON VEHICLE SAFETY RESTRAINT

(71) Applicant: Christopher J. Henderson, St. Louis, MO (US)

(72) Inventor: Christopher J. Henderson, St. Louis, MO (US)

( * ) Notice: Subject to any disclaimer, the term of this patent is extended or adjusted under 35 U.S.C. 154(b) by 253 days.

(21) Appl. No.: 18/787,826

(22) Filed: Jul. 29, 2024

(65) Prior Publication Data

US 2025/0033727 A1 Jan. 30, 2025

Related U.S. Application Data

(60) Provisional application No. 63/515,884, filed on Jul. 27, 2023.

(51) Int. Cl.

| | |
|---|---|
| ***B62J 27/10*** | (2020.01) |
| ***A62B 35/00*** | (2006.01) |
| ***B60R 21/00*** | (2006.01) |

(52) U.S. Cl.

CPC ........... *B62J 27/10* (2020.02); *A62B 35/0006* (2013.01); *B60R 2021/0088* (2013.01)

(58) Field of Classification Search

CPC ...... B62J 27/10; A62B 35/00; A62B 35/0006; B60R 22/00; B60R 2021/0088
USPC .............. 119/770; 224/158, 159, 160; 182/3
See application file for complete search history.

(56) References Cited

U.S. PATENT DOCUMENTS

| | | | | | |
|---|---|---|---|---|---|
| 4,028,742 | A * | 6/1977 | Marquis | A41F 9/005 | 2/311 |
| 4,560,097 | A * | 12/1985 | Reynolds | A41D 13/0007 | 224/160 |
| 4,746,084 | A * | 5/1988 | Strong | B64D 17/30 | D12/345 |
| 5,076,598 | A * | 12/1991 | Nauman | A47D 13/086 | 224/160 |
| 5,183,007 | A * | 2/1993 | Vincent | A61F 5/3784 | 119/857 |
| 5,190,306 | A * | 3/1993 | Nauman | B62J 25/04 | 224/159 |

(Continued)

FOREIGN PATENT DOCUMENTS

| | | | | |
|---|---|---|---|---|
| CA | 2652614 C * | 8/2011 | | B60R 22/10 |
| DE | 19950044 A1 * | 4/2001 | | B60R 22/14 |

(Continued)

*Primary Examiner* — Justin M Larson
(74) *Attorney, Agent, or Firm* — Charles McCloskey

(57) ABSTRACT

A vehicle safety restraint provides a harness for two persons, seated inline, as upon a motorcycle, all-terrain vehicle, snowmobile, personal watercraft and the like. The harness has a forward portion, generally worn by the operator, and a rearward portion, generally worn by the passenger. The forward and rearward portions are connected by horizontally positioned straps and have vertically positioned straps for securing each portion over the torso and shoulders and away from the necks of the operator and of the passenger. A spreader maintains the straps in an X like arrangement and has a construction comfortable upon the back of a passenger. The straps are connected by quick releases, or buckles, at key junctions and have adjustors that permit length adjustments of the straps, making them suitable for persons seated upright safely upon a vehicle.

19 Claims, 7 Drawing Sheets

(56) References Cited

U.S. PATENT DOCUMENTS

| | | | | | |
|---|---|---|---|---|---|
| 6,378,465 | B1 * | 4/2002 | Austin | A62B 35/04 182/4 |
| 6,651,594 | B1 * | 11/2003 | Bagwell | A62B 35/0006 119/857 |
| 6,971,476 | B2 * | 12/2005 | Wolner | A62B 35/0031 119/770 |
| 8,584,622 | B2 * | 11/2013 | Nishino | B62J 27/10 119/857 |
| 10,561,866 | B1 * | 2/2020 | Hinnant | A62B 35/0025 |
| D933,302 | S * | 10/2021 | Wilson | D29/101.1 |
| 11,814,124 | B1 * | 11/2023 | James | B62J 27/10 |
| 12,539,803 | B2 * | 2/2026 | Hoch | B60P 7/0853 |
| 2005/0067221 | A1 * | 3/2005 | Wolner | A62B 35/0031 119/770 |
| 2006/0090710 | A1 * | 5/2006 | Zazzara | B62J 27/10 119/770 |
| 2006/0254533 | A1 * | 11/2006 | Fuller | A62B 35/0006 119/770 |
| 2025/0033727 | A1 * | 1/2025 | Henderson | B62J 27/10 |

FOREIGN PATENT DOCUMENTS

| | | | | |
|---|---|---|---|---|
| DE | 102007001683 | A1 * | 7/2008 | B60R 22/00 |
| EP | 2221242 | A1 * | 8/2010 | B62J 27/10 |
| GB | 2249340 | | 5/1992 | |
| JP | 2006008030 | A * | 1/2006 | B62J 27/10 |

* cited by examiner

TWO PERSON VEHICLE SAFETY RESTRAINT

CROSS-REFERENCE TO RELATED APPLICATIONS

This non-provisional application claims priority to provisional application Ser. No. 63/515,884 filed on Jul. 27, 2023 which have a common inventor.

BACKGROUND OF THE INVENTION

The two person vehicle safety restraint generally relates to harness restraints and more specifically to a restraint for persons seated one behind the other, or inline, as primarily upon a motorcycle.

On roads and byways across the land, people ride motorcycles for pleasure and for transportation. To share the joy and excitement of riding a motorcycle, operators often carry a passenger. The passenger sits behind and in line with the operator. The passenger generally grasps the operator's waist with his or her hands while seated upon the rear seat of the motorcycle. The passenger can be a child who may become sleepy from the drone of the engine and the motorcycle wheels upon the pavement or other reasons. A sleepy passenger can loosen his or her grip upon the waist of the operator and slip to the side towards the rear wheel or the road. A sleepy, or less than careful, passenger may then fall off a motorcycle and may incur severe injury or even a fatality.

Also, a passenger utilizes body weight and hand grip to remain upon the seat of the motorcycle. During bumps, wet weather, and the like, the passenger may loosen his grip inadvertently or may have an excessive reactive centrifugal force that ejects the passenger for the motorcycle as during a turn.

DESCRIPTION OF THE PRIOR ART

Traditionally, a passenger on a motorcycle has reached forward and grasped the waist of a motorcycle operator. This prior art method works well for adults but less so for children, and others, not cognizant of the danger beside and below the vehicle. Sleepy people may loosen their grasp as they relax and doze. Children may loosen their grasp as they tire or become bored.

Others have made seats and seat backs that secure temporarily to the passenger seat. These seats attached to the motorcycle frame with bolts or welding, or strapped under or to the passenger seat. These seats required additional tools and skill for installation. During long road trips, the rigid seat tires the passenger resting against it also.

In other vehicles, drivers and operators remain secured to the vehicle using belts, straps, and harnesses. Belts typically cross the hips and the shoulders of an operator using separate pieces of material. Straps typically go over the shoulder to secure the arms using material generally positioned vertically. Harnesses go over the operator and secure the shoulders, torso, and hips of an operator. The harnesses have interconnected vertical and horizontal members that are moved as a unit when the harness is installed or when removed from an operator. For example, the Securon Company, of England, manufactures a single person fixed racing, or rally, sports car harness. This harness secures a driver over both shoulders to a seat within a car. The harness has the Securon part numbers of 605 and 655. The harness generally has a fixed securement to the top of a seat and then a releasable connection lower on the seat adjacent to the hips of the operator wearing the harness. One release connection is shown in the British Patent No. 2,249,340 to Proctor. This patented connection has a clip that inserts into a channel and abuts a spring while engaging a pressure mechanism. Some harnesses have multiple members that connect at a single release mechanism located over the chest of the operator.

The present invention overcomes the difficulties of the prior art. Unlike harnesses which secure to a seat, the present invention secures simultaneously around the torsos of an operator and a passenger. The present invention mutually secures the passenger to the operator and friction between the passenger, seat, and operator keeps the passenger upon the seat of a motorcycle during most maneuvers. Unlike other seats, the present invention does not attach to the motorcycle frame which lessens the labor in using the present invention and lessens the alterations to the motorcycle frame. And unlike a passenger merely grasping an operator, the present invention secures the waist of the passenger to the operator permitting the passenger free use of his hands. The operator, wearing part of the present invention, is presumed attentive when operating a motorcycle.

SUMMARY OF THE INVENTION

Generally, the present invention provides a harness for two persons, seated inline, as upon a motorcycle, all-terrain vehicle, snowmobile, personal watercraft and the like. The harness has a forward portion, generally worn by the operator, and a rearward portion, generally worn by the passenger. The forward and rearward portions are connected by a horizontal strap and have vertically positioned straps for securement of each portion over the torso and shoulders of the operator and the passenger. The straps are connected by buckles at key junctions and have adjustors upon the straps making the portions suitable for a person seated upright, big or small.

There has thus been outlined, rather broadly, the more important features of the invention in order that the detailed description thereof that follows may be better understood and that the present contribution to the art may be better appreciated. The present invention also includes padded hip belting, handles upon the belts for grasping by the passenger, quick release connectors for the belts, and an additional belt to encircle the waist of the operator. The present invention can be used by children under the age of eighteen, of various heights, and of various weights. The present invention adjusts to fit the shape of the operator of a motorcycle and of the passenger sitting behind the operator, particularly a child. Though usage of the present invention upon a motorcycle is described, the present invention may also be used upon other two seat vehicles such as all-terrain vehicles, snowmobiles, personal watercraft, scooters, and the like where people sit one behind the other. Additional features of the invention will be described hereinafter, and which will form the subject matter of the claims attached.

Numerous objects, features and advantages of the present invention will be readily apparent to those of ordinary skill in the art upon a reading of the following detailed description of the presently preferred, but nonetheless illustrative, embodiment of the present invention when taken in conjunction with the accompanying drawings. Before explaining the current embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, the phraseology and terminology employed herein are for the purpose of description and should not be regarded as limiting.

One object of the present invention is to provide a new and improved two person safety restraint.

Another object is to provide such a safety restraint that adjusts for children and adults of various ages and sizes.

Another object is to provide such a safety restraint that secures a passenger more securely to a motorcycle operator for better control and awareness of the passenger.

Another object is to provide such a safety restraint that reduces the incidence of accidental falls of children from motorcycles and other vehicles.

Another object is to provide such a safety restraint with handles integral to the belt portion between the operator and the passenger to assist the passenger in grasping the operator of a motorcycle.

Another object is to provide such a safety restraint in multiple colors to complement the vehicle color.

Another object is to provide such a safety restraint with reflective stripes and the like to assist in identifying a motorcycle or other vehicle at night.

Another object is to provide such a safety restraint in a pattern of camouflage colors for use in rugged conditions and upon vehicles used during hunting.

These together with other objects of the invention, along with the various features of novelty that characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated a preferred embodiment of the invention.

BRIEF DESCRIPTION OF THE DRAWINGS

In referring to the drawings.

The same reference numerals refer to the same parts throughout the various figures.

DESCRIPTION OF THE PREFERRED EMBODIMENT

Figure 1:
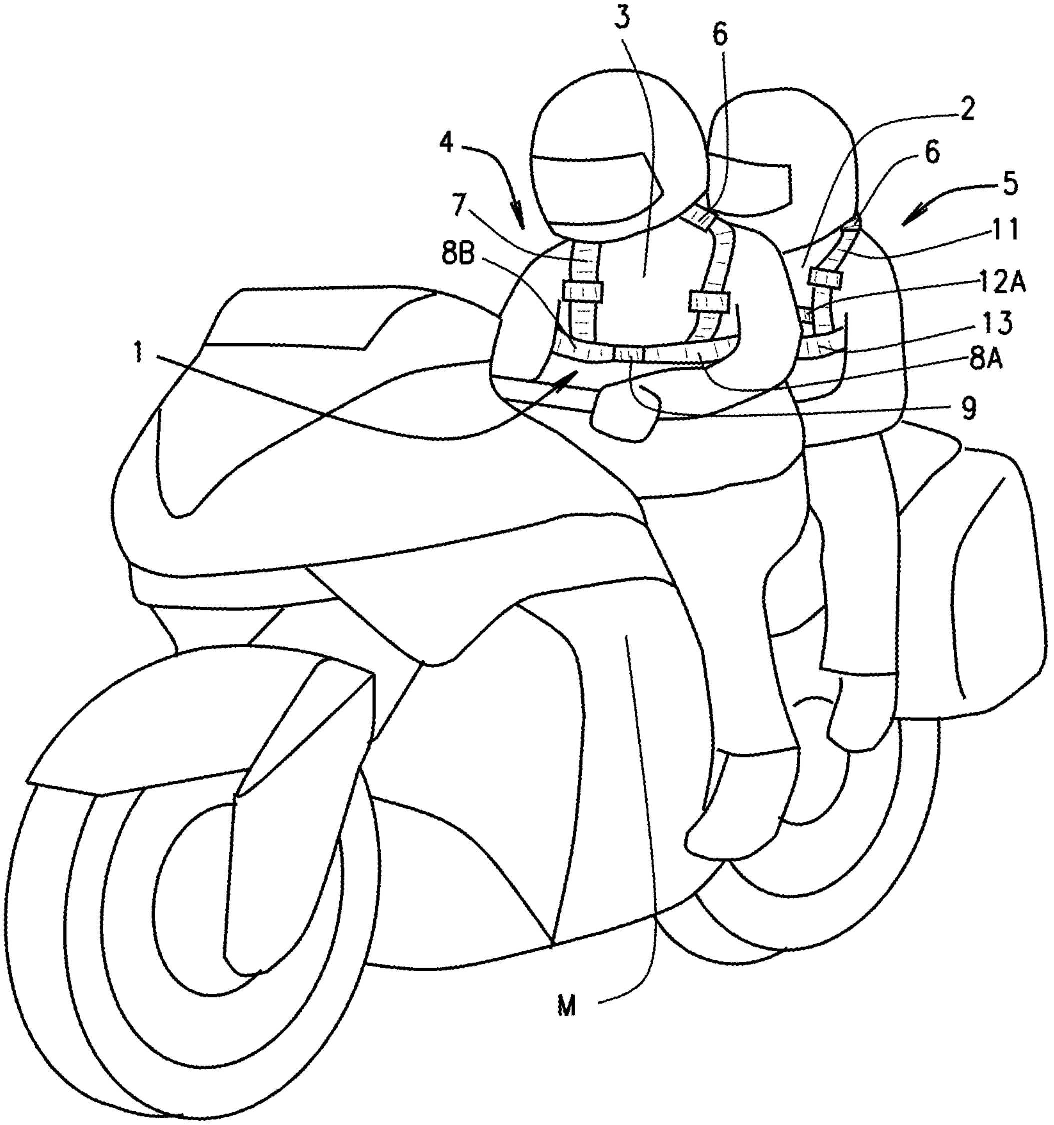
FIG. 1 illustrates a perspective view of an alternate embodiment of the present invention when worn by an operator and a passenger.

The present art overcomes the prior art limitations by a harness 1 suitable for two persons seated inline that secures upon the torso and waist of both persons. In doing so, the present invention provides physical securement of a passenger 2 to a vehicle operator 3, primarily a motorcycle operator. Beginning on FIG. 1, an operator runs a motorcycle M while seated in the seat and grasping the handle bars. A passenger sits upon the seat rearward of the operator and generally within arm's length of the operator. The present invention, here in its alternate embodiment, has a forward portion 4 and a rearward portion 5. The forward portion is here shown worn by the operator towards the front of the motorcycle. The forward portion has a collar 6 that passes behind the neck of the operator and connects to two straps 7 that descend over the chest of the operator to a belt. Each strap connects to a portion 8 of belt and each belt portion comes together at the operator's waist with a quick release connector 9.

The rearward portion is worn by the passenger, seated behind the operator. The rearward portion has a collar 10 located behind the neck of the passenger that joins with two straps 11. The straps descend over the chest of the passenger vertically, similar to suspenders. The straps connect to belt portions. Unlike the forward portion, the rearward portion has belt portions 12 that encircle the waist of the passenger. The belt portions also come together in the front of the passenger's waist at a quick release connector 9.

The belt portions of the present invention extend from the rearward portion alongside the operator to the forward portion. The extension 13 of the belt portions connect the forward and rearward portions of the harness and effectively secure the passenger to the operator. The operator and the passenger then move as a unit as the motorcycle moves along.

Figure 2:
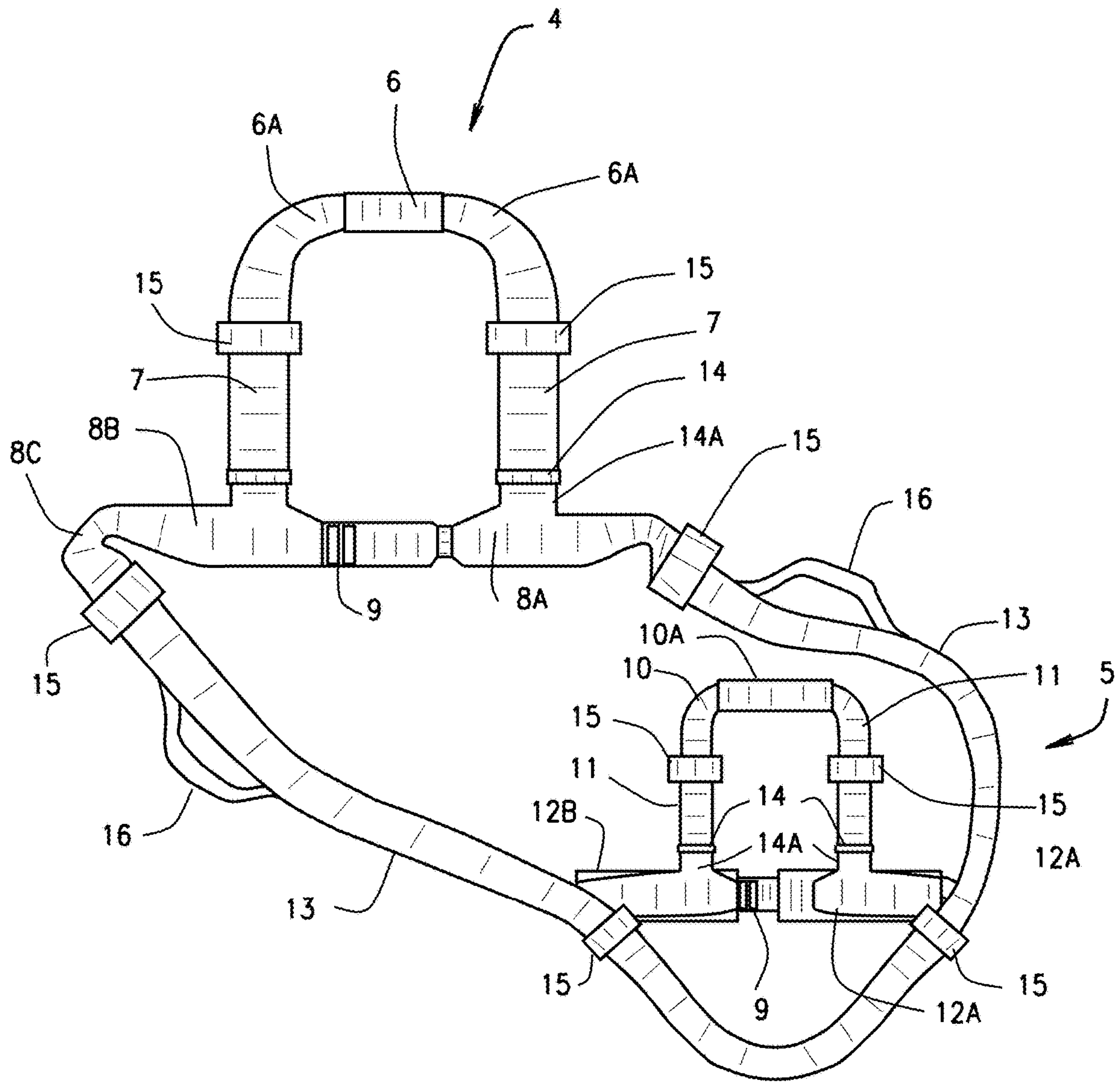
FIG. 2 shows an isometric view of the alternate embodiment with the forward portion in the background and the rearward portion in the foreground.

FIG. 2 shows the alternate embodiment of the present invention itself in a perspective view. The forward portion has a collar, generally shown centered and horizontal. The collar passes behind the neck of the operator, generally below the helmet. The collar has a cushion 6*a* thereon for the comfort of the operator. The collar is generally rectangular and elongated with two ends. From each end of the collar, a strap 7 descends. The straps have an orientation generally perpendicular to the collar and an elongated, ribbon like shape. Each strap continues away from the collar to a link 14 which the strap encircles. Each strap then returns towards the collar and secures to an adjustor 15.

Figure 2A:
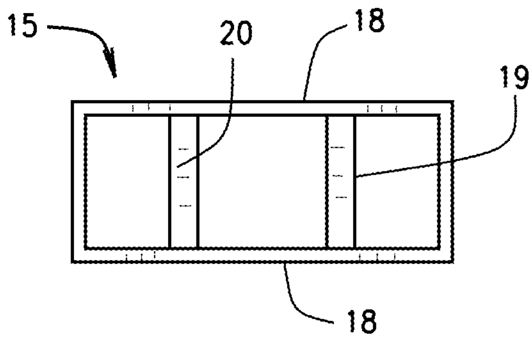
FIG. 2A is a detailed view of an adjustor upon a belt or strap.

Preferably the adjustor 15 has a rectangular shape in FIG. 2A with a hollow center. The adjustor has two parallel and spaced apart sides 18 joined by two bars perpendicular to the sides. The bars have a generally flat cross section and are mutually parallel with a forward bar 19 and a rearward bar 20. The adjustor admits a strap over the forward bar, around the rearward bar, and then back over the forward bar. The forward bar has a narrow space above it to confine the strap so that friction at the forward bar and the rearward bar retains the adjusted length of the strap when placed under a load. When the load is released, the strap can be adjusted in length manually.

Figure 2B:
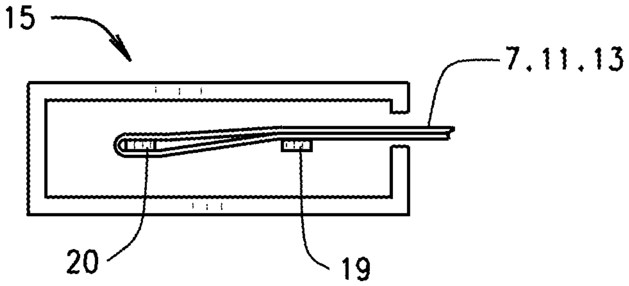
FIG. 2B is a section view through an adjustor of FIG. 2A.

FIG. 2B shows an adjustor 15 in a side view where a strap, as at 7, 11, 13 enters over the forward bar 19. The strap then wraps around the rearward bar 20 and returns beneath the previous portion of strap also over the forward bar. The friction of the strap to itself in the overlap upon the forward bar and of the strap to the forward bar prevent the strap from lengthening during usage in this alternate embodiment.

Figure 2C:
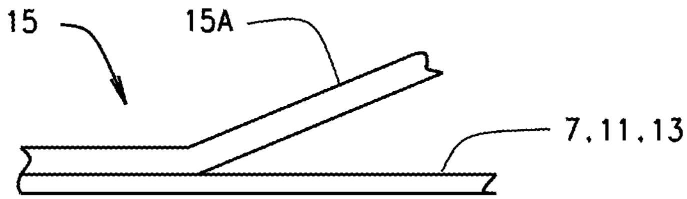
FIG. 2C is a detailed view of the clamping action of an adjustor.

Further shown in FIG. 2C, the adjustor 15 has a generally rectangular shape in its side view here and a lever 15*a* that the operator can grasp. Upon lifting the lever, the strap may move, allowing for the lengthening and shortening of the strap around the link. When the strap has a comfortable length, the operator closes the lever and secures the adjustor. The operator repeats the adjustment to the other strap.

Below the straps, each link 14 connects to a belt portion, here showing left 8*a* and right 8*b* portions. Each belt portion is generally parallel to the collar and extends upon the front of the waist of the operator. Each belt portion has a generally rectangular shape with two parallel and spaced apart longitudinal edges and two lateral edges perpendicular to the longitudinal edges. Each belt portion is adjacent to a link 14, off center upon a longitudinal side. Each link secures to a belt portion using a short section of webbing 14*a*, similar to that of the straps. Upon one lateral end on each belt portion, generally proximate the link, each belt portion has a quick release 9. The quick release is a mechanical buckle that secures the left and right belt portions generally upon the center of the waist at the front of the operator. Additionally, each belt portion has a pad 8*c* of greater width than the width of a belt portion for distributing loads from the belt portion to the operator's torso as later described.

Opposite the forward portion, the harness has the rearward portion 5 previously shown in the foreground of FIG. 2. The rearward portion is worn by the passenger when seated behind the operator. The rearward portion has a collar 10, positioned behind the neck of the passenger and below the helmet. The collar has a generally rectangular shape with a cushion 10*a* extending for its length that protects the neck when the rearward portion is worn. The collar has two ends from which extend generally perpendicular two straps. The straps 11 are spaced apart and mutually parallel. The straps extend down the torso of the passenger. Similar to before, the straps have an orientation generally perpendicular to the collar and an elongated, ribbon like shape, or webbing. Each strap continues away from the collar to a link 14 which the strap encircles. Each strap then returns towards the collar and secures to an adjustor.

The preferred adjustor 17 allows the passenger or operator to loosen the strap and adjust its length by adjusting the loop around the rearward bar. When the strap fits comfortably, the passenger or the operator lays the strap flat upon the forward bar, so friction holds the strap in place.

The alternate adjustor 15 has a generally rectangular shape and a lever 15*a* that the passenger or the operator can grasp. Upon lifting the lever, the strap may move, allowing for the lengthening and shortening of the strap around the link. When the strap has a comfortable length, the passenger or the operator closes the lever and secures the adjustor. The other strap is then adjusted in a similar manner. In the rearward portion, the straps are of less length than the forward portion, generally for a child.

Below the straps, each link connects to a belt portion, here showing left 12*a* and right 12*b* portions. Each belt portion is generally parallel to the collar and extends upon the front of the waist of the operator. Each belt portion has a generally rectangular shape with two parallel and spaced apart longitudinal edges and two lateral edges perpendicular to the longitudinal edges. Each belt portion is adjacent to a link 14, off center upon a longitudinal side. Each link secures to a belt portion using a short section of webbing 14*a*, similar to that of the straps. Upon one lateral end on each belt portion, generally proximate the link, each belt portion has a quick release 9. The quick release is a mechanical buckle that secures the left and right belt portions generally upon the center of the waist at the front of the operator. Additionally, each belt portion has a pad 12*c* of greater width than the width of a belt portion for distributing loads from the belt portion to the operator's torso as later described.

Opposite the quick release component 9 upon each belt portion, another adjustor connects a belt portion to the extension 13 of the belt that spans from the passenger to the operator. The belt extends from the rear of the waist of the passenger forward, along both sides of the passenger. Generally, in the vicinity of the passenger's hip, an adjustor 15 connects to each belt portion. As the harness has two cooperating adjustors 15 in the rearward portion, the belt extension 13 can be made snug as it proceeds around the waist of the passenger. In the preferred embodiment shown here, the belt and the rearward portion fasten upon the waist and over the shoulders of the passenger whereas the forward portion fastens only over the shoulders of the operator.

From the passenger, the belt extends forward on both sides towards the forward portion. Similar to the rearward portion, the belt approaches the belt portions, two spaced apart on the sides of the operator. The belt has a generally elongated rectangular shape. Where the belt terminates proximate the belt portion, the belt has adjustors 15 or 17, one on each side of the operator. As before, the adjustors have a generally rectangular shape with a lever 15*a* that clasps the belt firmly. Each adjustor connects to one lateral end of a belt portion, generally opposite a component of the quick release. The adjustors permit changing the length of the belt between the passenger and the operator upon both sides for comfort. In an alternate embodiment, the belt has two handles 16 slightly rearward from the adjustors 15. The handles secure upon two points to the belt and extend outwardly. The handles provide the passenger a place to grasp the belt without having to grasp the waist of the operator. The handles are generally of a narrow strap form, proximate a longitudinal edge of the belt.

In a further alternate embodiment, the harness includes variations upon the suspension of the rearward portion. The rearward portion generally secures a passenger, such as a child, to the operator or the driver of the motorcycle. In this alternate embodiment, the straps 11 attain a generally Y shape where two straps extend from the front of the belt, over the chest of the passenger, over the shoulders, and down the back of the passenger to a common point. The common point joins the two straps into a single strap that proceeds to the rear of the belt. The common point can be reinforced webbing, a leather gusset, or a plastic plate to accommodate the straps at various angles approaching the common point and departing the common point for the belt. The Y shape secures the harness upon the passenger with minimal pressure or abrasion upon the passenger's neck.

Turning to the preferred embodiment, it configures the rearward portion to also avoid neck pressure upon the passenger. This preferred embodiment provides straps from the forward portion, over the shoulders of the operator and the passenger, and to an intersection point upon the back of the passenger. The intersection point overlaps the two straps which attain an X like arrangement. From the intersection point, the two straps proceed in a spaced apart manner to connect as later described in FIG. 3. The X like arrangement of the straps, in this preferred embodiment, distributes the loads from the straps upon the shoulders of the passenger away from the neck improving the comfort of the passenger. The preceding embodiments can be envisioned similar to suspenders for trousers and other garments though made more rugged for use while riding a motorcycle.

Figure 3:
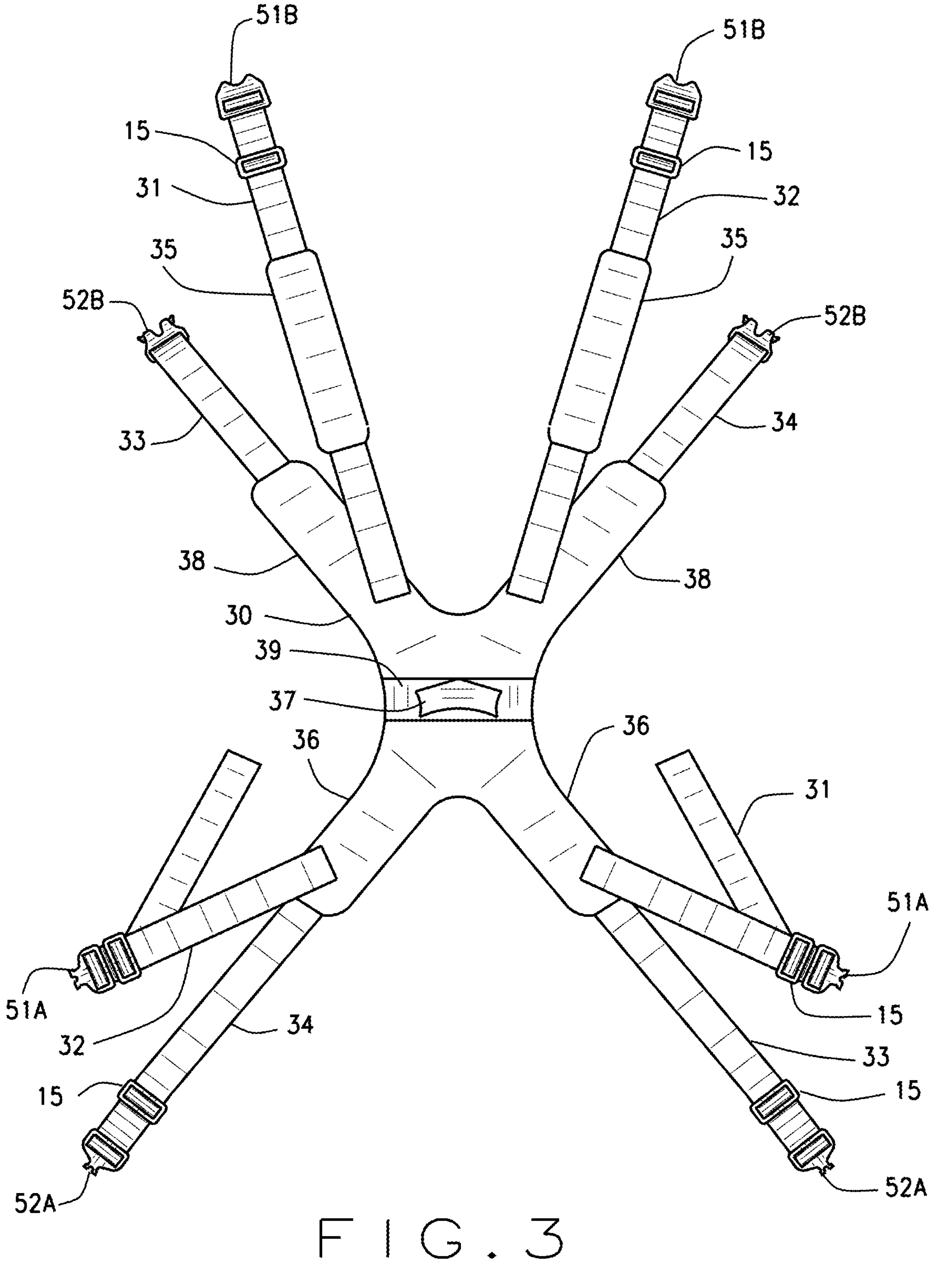
FIG. 3 is a top view of the present invention.

Turning to FIG. 3, it shows a top view of the preferred embodiment of the invention, before placing upon an operator and a passenger. Starting from the 11 o'clock position of this figure, the invention 1 begins with a first strap 31 of a flexible, elongated form. The first strap has two opposite ends. One end folds upon itself and secures a first buckle, as in 51, with its first female receptacle 51*b* shown outwardly from the invention. The first strap continues inwardly from the first female receptacle 51*b* to an adjustor 15. The adjustor allows an operator to lessen or extend the length of the first strap, later worn over the torso of the operator. The first strap continues inwardly and fits into a first pad 35 which has a flat sleeve like construction. The first pad actually contacts the torso of an operator during usage.

The first strap continues inwardly to a spreader 30 that has an X like shape as shown. The spreader has an outer layer in the foreground and a backer in the background. The first strap enters the spreader between the outer layer and the backer and proceeds to a plate 37. The plate secures the spreader relative to the first strap 31 and the first strap passes into slots, later shown, in the plate. After the plate 37, the first strap then proceeds outwardly between the outer layer and the backer diagonally opposite from where the first strap entered the spreader. The first strap passes through a third pad 36, also having a sleeve like construction, and continues outwardly. The first strap then has its other end that also folds upon itself but secures a different part of the first buckle, as in 51. Here the first strap has the first buckle's male tip 51*a* shown outwardly from the invention and to the right. The first strap continues outwardly from the first male tip 51*a* to another adjustor 15 so an operator may shorten or lengthen the first strap, later worn over the torso of the operator during usage. In FIG. 3 as shown, the first strap 31 proceeds from the upper left of the figure to the lower right and generally out of the plane from other straps as later described.

Starting from the 1 o'clock position of this figure, the invention 1 has its second strap 32 also of a flexible, elongated form. The second strap has two opposite ends. One end folds upon itself and secures its first buckle, as in 51, with its first female receptacle 51*b* shown outwardly from the invention. The second strap continues inwardly from the first female receptacle 51*b* to an adjustor 15. The adjustor allows an operator to lessen or extend the length of the second strap, later worn over the torso of the operator. The second strap continues inwardly and fits into another first pad 35 of a flat sleeve like construction. The first pad once more contacts the torso of an operator during usage.

The second strap continues inwardly to the spreader 30 that has an X like shape as shown while the second strap has a mirror image like arrangement from the first strap. The spreader has its outer layer in the foreground and its backer in the background as before. The second strap enters the spreader between the outer layer and the backer and proceeds to the plate 37, rightward of the first strap. The plate as before secures the spreader relative to the second strap 32 as it then passes into slots at an angle to the previous slots that received the first strap, later shown, in the plate. After the plate 37, the first strap then proceeds outwardly between the outer layer and the backer diagonally opposite from where the second strap entered the spreader. The second strap passes through a third pad 36, also having a sleeve like construction, and continues outwardly. The second strap then has its other end that also folds upon itself but secures a different part of a first buckle, as in 51. Here the second strap has the first buckle's male tip 51*a* shown outwardly from the invention and to the left. The second strap continues outwardly from the first male tip 51*a* to another adjustor 15 so an operator may adjust the length of the second strap, later worn over the torso of the operator generally opposite that of the first strap during usage. In FIG. 3 as shown, the second strap 32 proceeds from the upper right of the figure to the lower left and generally out of the plane from other straps as later described.

Of note, the first strap 31 and the second strap 32 each have their female receptacles 51*b* and their cooperating male tips 51 so that only the first strap and the second strap use first buckles, as at 51. This receptacle and tip positioning prevents connecting the first strap and the second strap to later straps.

Turning to the later straps, the invention has a third strap 33 starting at the 10 o'clock position of this figure. The third strap also has two opposite ends. One end folds upon itself and secures a second buckle, as in 52, with its second female receptacle 52*b* shown outwardly from the invention, towards the left of the figure. The third strap continues inwardly, at a convex angle, from the second female receptacle 52*b* to a second pad 38 which has a flat sleeve like construction and extends radially outward from the spreader 30. The second pad actually contacts the torso of a passenger during usage.

The third strap 33 continues inwardly to the spreader 30 at the upper left part of its X like shape as shown. The spreader has an outer layer in the foreground and a backer in the background. The third strap enters the spreader between the outer layer and the backer and proceeds to the plate 37. The plate secures the third strap 33 relative to the spreader as it passes into slots different from those that secured the first strap and second strap described above. After the plate 37, the third strap then proceeds outwardly between the outer layer and the backer, and beneath the first strap 31, diagonally opposite from where the third strap entered the spreader. The third strap exits the sleeve like construction of the spreader and continues outwardly, downwardly to the right in this figure. The third strap then has its other end that also folds upon itself but secures a different part of the second buckle, as in 52. Here the third strap has the second buckle's male tip 52*a* shown outwardly from the invention and to the right. The third strap continues outwardly from the second male tip 52*a* to another adjustor 15 so an operator may shorten or lengthen the first strap, later worn over the torso of the passenger during usage. In FIG. 3 as shown, the third strap 33 proceeds from the middle left of the figure to the lower right and generally into the plane beneath the second strap and the first strap within the spreader.

That brings us to the fourth strap 34 of the invention starting at the 2 o'clock position of this figure. The fourth strap also has two opposite ends. One end folds upon itself and secures another second buckle, as in 52, with its second female receptacle 52*b* shown outwardly from the invention, towards the right of the figure. The fourth strap continues inwardly, at a convex angle, from the second female receptacle 52*b* into a flat sleeve like construction of the spreader that extends radially outward from it. This sleeve like part of the spreader actually contacts the torso of a passenger during usage.

The fourth strap 34 continues inwardly to the spreader 30 at the upper right part of its X like shape as shown. The spreader has an outer layer in the foreground and a backer in the background and the fourth strap enters the spreader between the outer layer and the backer and proceeds to the plate 37. The plate secures the fourth strap 34 relative to the spreader as it passes into slots different from those that secured the first strap and the second strap described above. After the plate 37, the fourth strap then proceeds outwardly between the outer layer and the backer, and beneath the second strap 32, diagonally opposite from where the fourth strap entered the spreader. The fourth strap exits the sleeve like construction of the spreader and continues outwardly, downwardly to the left in this figure. The fourth strap then has its other end that also folds upon itself but secures a different part of the second buckle, as in 52. Here the fourth strap has the second buckle's male tip 52*a* shown outwardly from the invention and to the left. The fourth strap continues outwardly from the second male tip 52*a* to another adjustor 15 so an operator may shorten or lengthen the fourth strap, later worn over the torso of the passenger during usage. In FIG. 3 as shown, the fourth strap 34 proceeds from the middle right of the figure to the lower left and generally into the plane beneath the second strap, the first strap, and the third strap within the spreader.

Also of note, the third strap 33 and the fourth strap 34 each have their female receptacles 52*b* and their cooperating male tips 52*a* so that only the third strap and the fourth strap use second buckles, as at 52. This receptacle and tip positioning prevents connecting the third strap and the fourth strap to the first strap and the second strap. Those specific connections prevent an operator improperly connecting the straps during usage of the harness of the invention.

Figure 4:
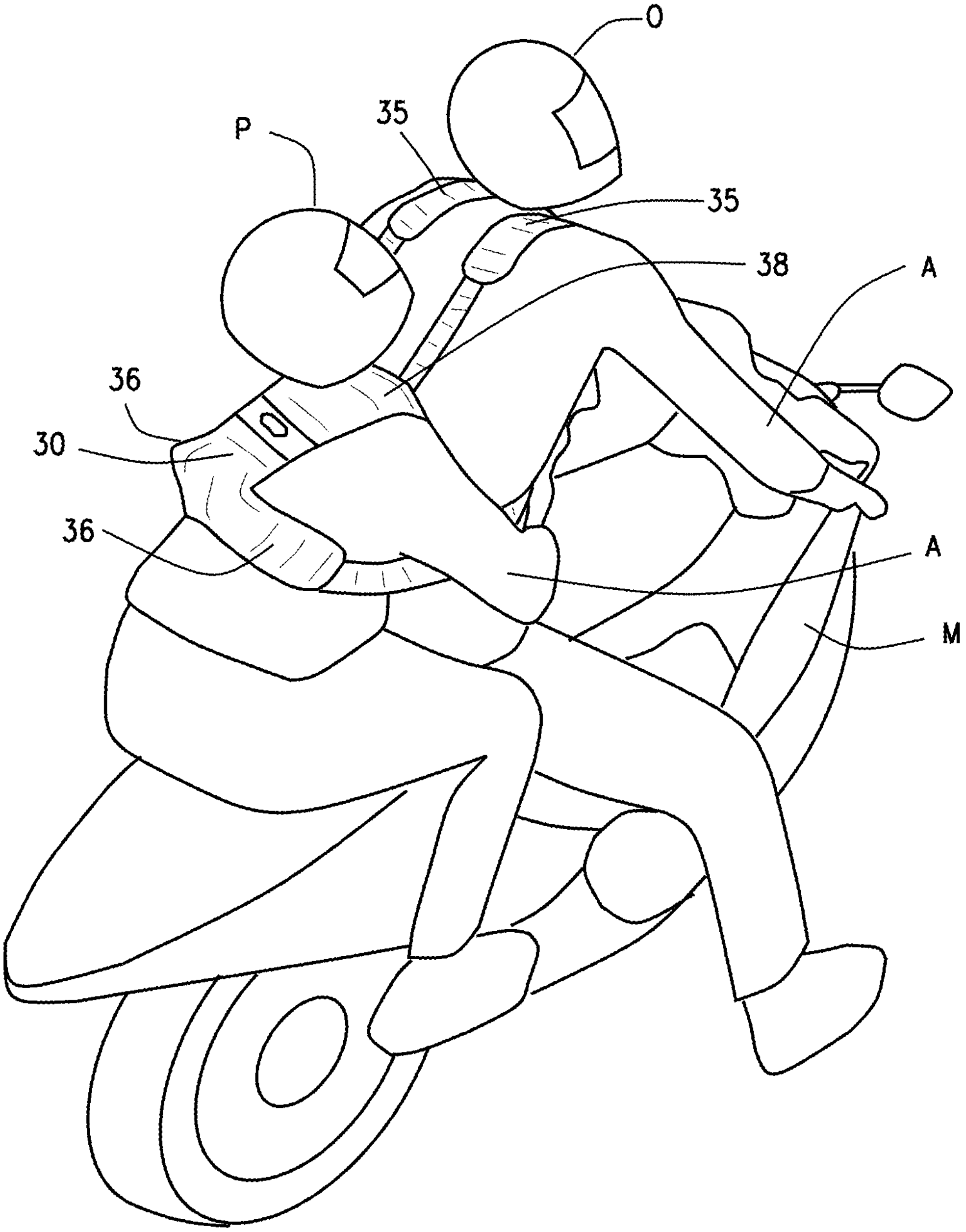
FIG. 4 is a rear environment view of the present invention upon two users.

FIG. 4 the provides a rear perspective view of the invention during usage. The invention 1 fits upon an operator O and a passenger P behind the operator O as both sit upon a motorcycle M. The operator O has his arms A upon the handgrips of the motorcycle and the passenger P has her arm A upon the waist, that is, below the shoulders of the operator O as shown. The passenger P has the spreader 30 upon the back of her torso as shown. The spreader orients the invention 1 so that the first strap 31 extends from the spreader over the left shoulder of the passenger P and to the left shoulder of the operator O. Then the second strap 32 extends from the spreader over the right shoulder of the passenger P and on to the right shoulder of the operator O.

The first strap 31 wraps over the left shoulder of the operator O and then across and down the front of the operator's torso, not shown, and returns rearward to near the passenger's right hip to a first buckle 51 the connects a first female receptacle 51*b* from the forward portion 5 to a first male tip 51*a* near the rear portion 4.

The second strap 32 similarly wraps over the right shoulder of the operator O and then across and down the front of the operator's torso, not shown, and returns rearward to near the passenger's left hip to the other first buckle 51 that then connects a first female receptacle 51*b* from the forward portion 5 to a first male tip 51*a* near the rear portion 4.

Beneath and inside of the first strap 31 and the second strap 32, the third strap 33 extends over the left shoulder of the passenger P, not shown and then across and down the front of the passenger's torso to the lower right hip. There, a second buckle 52 then connects a second female receptacle 52*b* from the forward portion 5 to a second male tip 52*a* near the rear portion 4.

Then similarly, the fourth strap 34 extends over the right shoulder of the passenger P and then across and down the front of the passenger's torso to the lower left hip. There, another second buckle 52 then connects a second female receptacle 52*b* from the forward portion 5 to a second male tip 52*a* near the rear portion 4.

In the preferred embodiment, the third strap 33 and the fourth strap 34 attain an X like pattern upon the torso of the passenger opposite the spreader 30 for even load distribution. This arrangement of the two straps secures a child or other person snugly. In an alternate embodiment of the two straps, the third strap and the fourth strap wrap around the left shoulder and the right shoulder of the passenger respectively forming snug loops though a passenger must use caution that her arms do not slip through the loops during usage.

Figure 5:
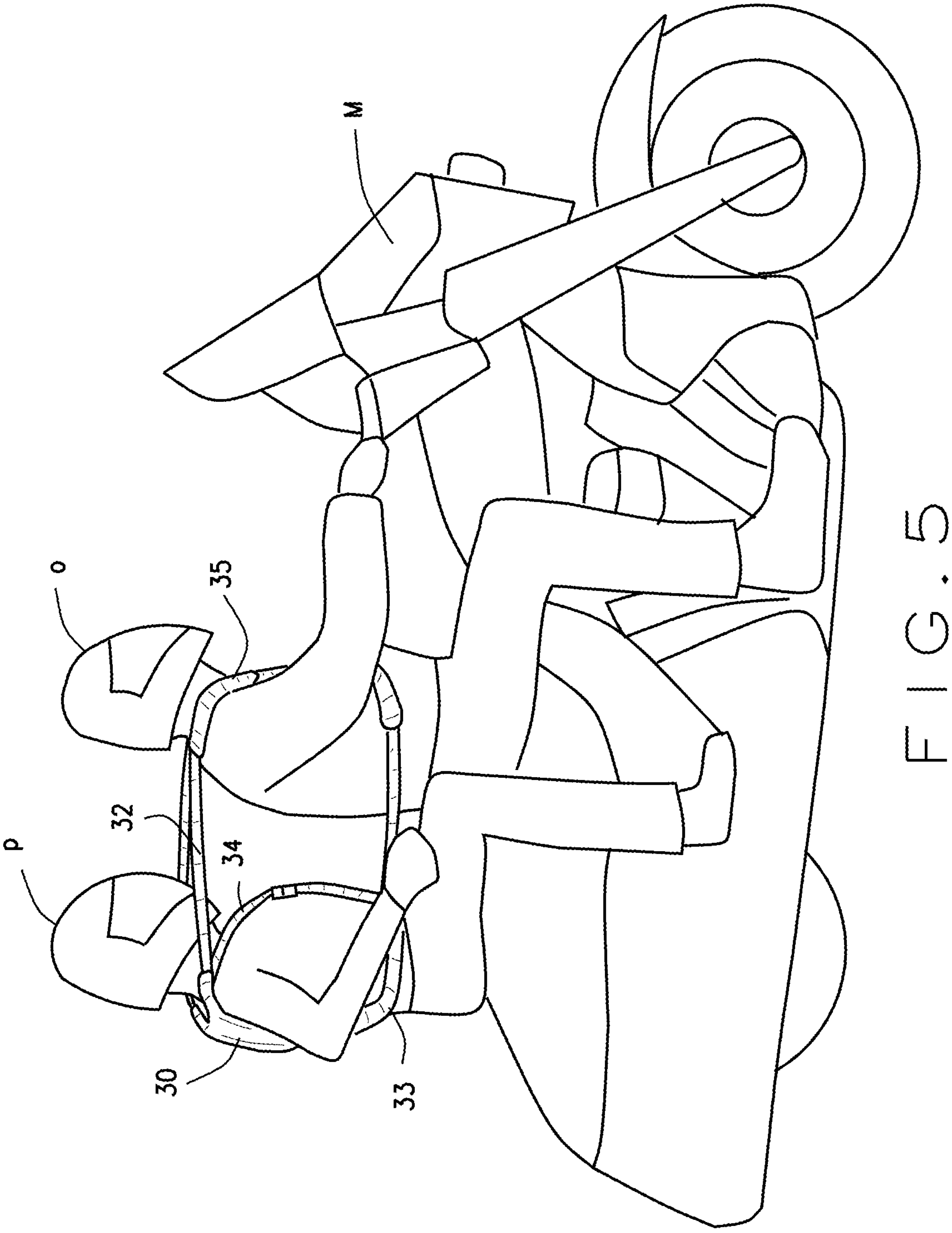
FIG. 5 is a side environment view of the present invention upon two users.

FIG. 5 then shows a side view of the invention during its usage. The invention 1 fits upon and around the shoulders of an operator O and a passenger P as before with the passenger P sitting behind the operator O upon a motorcycle M or other vehicle. The operator O has his arms A upon the handgrips as before, here shown to the right, and the passenger P has her arm A upon the waist of the operator O as shown. The passenger P has the spreader 30 upon the back of her torso as shown on its edge with a vertex of the X like shape between the apparent ends of the second strap 32 and the third strap 33 to the left of the figure. Here, the spreader orients the invention 1 so that the second strap 32 extends from the spreader over the right shoulder of the passenger P and to the right shoulder of the operator O. Then the second strap extends down the torso of the operator O through the first pad 35. The second strap then continues rearwardly to a first buckle behind an arm of the passenger P. Beneath the second strap 32, the fourth strap 34 extends from the spreader over the right shoulder of the passenger P and across her torso into the plane of the figure for connecting to a second buckle, not shown, on her left hip. The third strap 33 extends from the front of the passenger's torso rearward to the spreader 33 with a second buckle behind the passenger's right arm in this figure.

Figure 6:
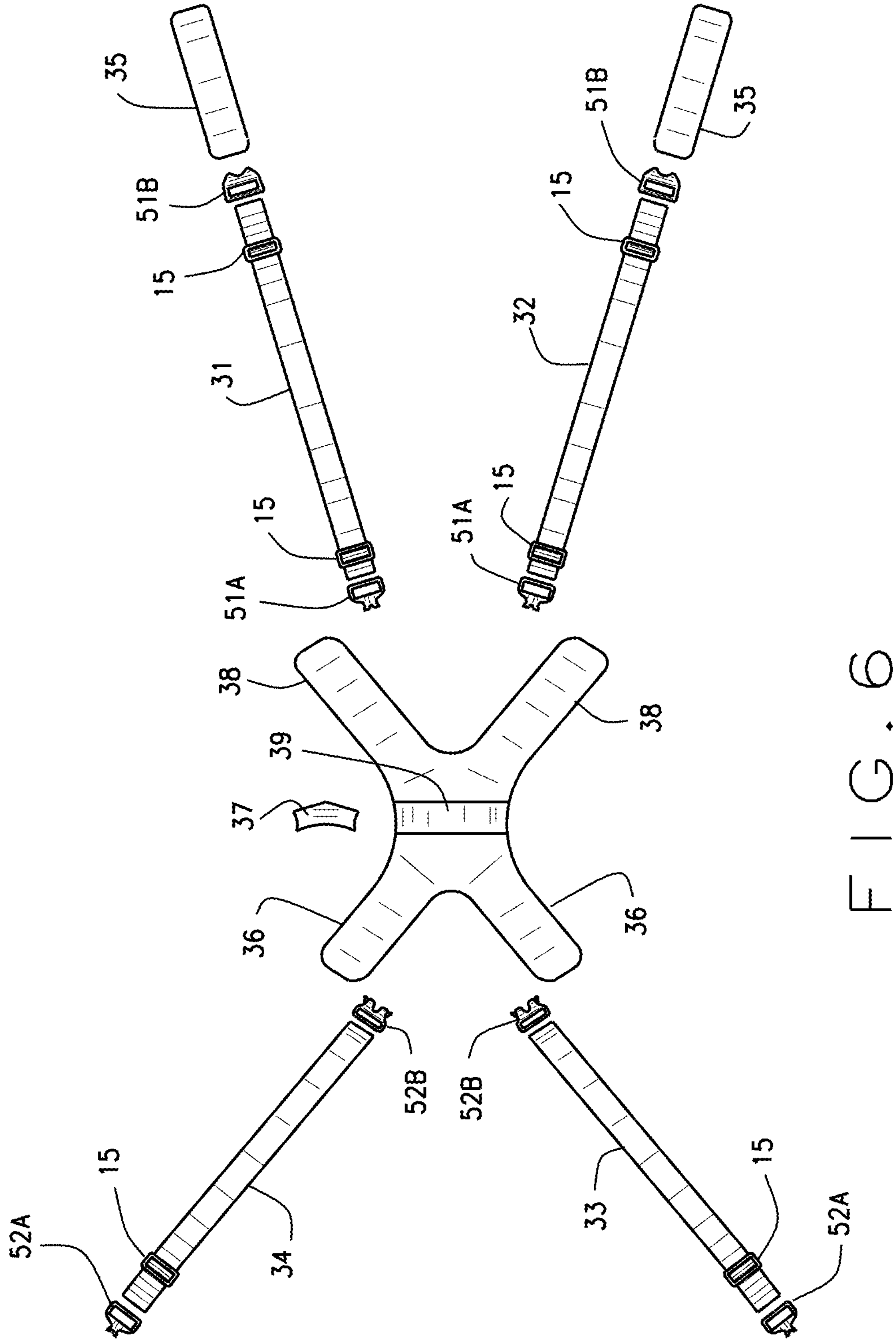
FIG. 6 is an exploded view of the present invention.

FIG. 6 then provides an exploded view of the invention 1 and its components beginning with the spreader 30 in the center of the figure with its generally X like shape. The spreader has its flexible fabric construction and has its two third pads 36 at an angular relationship to their common vertex with the remainder of the spreader. The third pads have their sleeve like construction for admission of the four straps 31, 32, 33, 34 as described above. Inwardly from the third pads 36, the spreader reveals its backer as a center portion 39 of the spreader lacks a sleeve like construction. To the right of the center portion 39 and opposite the third pads, the spreader has its second pads 38 also at an angular relationship to their common vertex, generally asymmetric to the second pads 38 as the third pads 36 have a slightly longer length than the second pads 38.

Proximate the spreader 30, here shown above it in the figure, the invention has its plate 37, preferably with a hexagonal shape as shown. The plate includes at least two parallel transverse slots, here shown left to right, and at least four angled slots here shown at an angle to the transverse slots. The at least four angled slots receive the third and fourth straps during usage.

The first strap 31 appears shown up and to the right of the spreader 30 in this figure. The first strap has its flexible, elongated form as shown and with two opposite ends. At each end, the first strap folds over and fits its free portion through an adjustor 15 so that an operator or a passenger may adjust the length of the first strap for a comfortable, secure fit. Between the first strap and the second pad 38, this figure shows a first male tip 51*a* oriented with the tip itself towards the spreader. Away from the spreader and the first strap, the invention has opposite the first male tip 51*a* its first female receptacle 51*b*. During usage, the first male tip 51*a* connects to the first female receptacle 51*b* forming a first buckle as at 51, generally located proximate the hip of a passenger. Outwardly from the first female receptacle 51*b* near the first strap 31, the invention has its first pad 35 of a flat, sleeve like construction that fits around a portion of the first strap as it rests upon the torso of an operators.

The second strap 32 appears shown down and to the right of the spreader 30 in this figure, that is, clockwise in rotation away from the first strap. The second strap also a flexible, elongated form as shown that has opposite ends. At each end, the second strap folds over and fits its free portion through an adjustor 15 so that an operator or a passenger may adjust the length of the second strap for a comfortable, secure fit. Between the second strap and the second pad 38, this figure shows another first male tip 51*a* oriented with the tip itself towards the spreader. Away from the spreader and the second strap, the invention has opposite the first male tip 51*a* its first female receptacle 51*b*. During usage, the first male tip 51*a* connects to the first female receptacle 51*b* forming another first buckle as at 51, generally located proximate the other hip of a passenger. Outwardly from the first female receptacle 51*b* near the second strap 32, the invention has another first pad 35 of a flat, sleeve like construction that fits around a portion of the second strap as it rests upon the torso of an operators.

The third strap 33 then has its position down and to the left of the spreader 30 in this figure, that is, clockwise in rotation away from the second strap. The third strap 33 appears outwardly from a third pad 36. The third strap has its flexible, elongated form that also has two opposite ends. At the end outward from the spreader, the third strap folds over and fits its free portion through an adjustor 15 so that an operator or a passenger may adjust the length of the third strap for a comfortable, secure fit upon the torso of the passenger. Between the third strap and the third pad 36, this figure shows a second female receptacle 52*b* oriented towards the spreader. Away from the spreader and the third strap, the invention has opposite the second female receptacle 52*b*, a second male tip 52*a*. During usage, the second male tip 52*a*. connects to the second female receptacle 52*b* forming a second buckle as at 52, also generally located proximate the hip of a passenger. In an alternate embodiment, outwardly from the second male tip 52*a*, the invention has an additional first pad 35 of a flat, sleeve like construction that fits around a portion of the third strap as it rests upon the side of a passenger.

And, the fourth strap 34 then has its position up and to the left of the spreader 30 in this figure, that is, clockwise in rotation away from the third strap, or counterclockwise in rotation away from the first strap. The fourth strap 34 appears outwardly from the other third pad 36 of the spreader. The fourth strap too has its flexible, elongated form that also has two opposite ends. At the end outward from the spreader, the fourth strap has a portion that folds over and fits its free portion through an adjustor 15 so that an operator or a passenger may adjust the length of the fourth strap for secure fit upon the torso of the passenger, or for comfort. Between the fourth strap and the third pad 36, this figure shows another second female receptacle 52*b* oriented towards the spreader. Away from the spreader and the fourth strap, the invention has opposite the second female receptacle 52*b*, another second male tip 52*a*. During usage, the second male tip 52*a*. connects to the second female receptacle 52*b* forming another second buckle as at 52, also generally located proximate the hip of a passenger. In an alternate embodiment, outwardly from the second male tip 52*a*, the invention has an additional first pad 35 of a flat, sleeve like construction that fits around a portion of the fourth strap as it rests upon the side of a passenger.

In summary, the third strap and the fourth strap cooperate with the spreader to form the rearward portion 4 of the invention when worn by a passenger. Then the first strap and the second strap cooperate with the spreader to form the forward portion 5 worn by an operator as its reaches back to a passenger shown in FIGS. 4, 5 previously.

The invention begins with a flexible, flat spreader where the spreader has two spaced apart second pads and two spaced apart third pads opposite the second pads. The second pads and the third pads extend outwardly from the spreader so the spreader, the second pads, and the third pads form together a planar X like shape. The first strap enters the spreader from a second pad through the opposite third pad. The second strap enters the spreader from the other second pad through the opposite other third pad. The third strap enters through another second pad, proceeding through the second pad beneath the first strap, and through the opposite third pad beneath the first strap. The fourth strap enters through the other second pad, proceeds through the other second pad beneath the second strap, and through the opposite third pad beneath the second strap.

The first strap has a first female receptacle outwardly from one of the second pads and a first male tip opposite the first female receptacle. The first male tip outwardly extends from a third pad so the first female receptacle and the first male tip mutually connect into a first buckle. The second strap then has another first female receptacle outwardly from a second pad and another first male tip opposite this first female receptacle, this first male tip outwardly extending from a third pad so the other first female receptacle and the other first male tip mutually connect into another first buckle.

The third strap has its second female receptacle outwardly from a second pad and a second male tip opposite the second female receptacle. The second male tip then extends outwardly from a third pad so the second female receptacle and the second male tip mutually connect into a second buckle. The fourth strap itself then has another second female receptacle outwardly from a second pad and another second male tip opposite the another second female receptacle. The another second male tip extends outwardly from a third pad so the another second female receptacle and the another second male tip mutually connect into another second buckle.

The two first female buckles cooperate with the first strap and the second strap to form the forward portion of the invention. The second female buckles upon the third strap and the fourth strap work together with the spreader to form the rearward portion of the device. The forward portion then fits upon and secures a first person to the invention and the rearward portion also fits upon and secures a second person to the invention and snugly behind the first person on their mutual vehicle. Any strap may fold upon itself for frictional engagement with an adjustor where two pieces of adjacent strap stay in position relative to each other when under load.

The harness is primarily made from U.S. Department of Transportation approved polyester seatbelt webbing, approximately 48 mm in width and approximately 0.045 inch in thickness. In the preferred embodiment, the quick releases, or buckles, have a steel construction. In an alternate embodiment, the quick releases, or buckles, are generally high impact plastic, such as that used in military ammunition belts. In an alternate embodiment, the buckles are made from cooperating sections of hook and loop fastener with a larger than normal surface area and greater frictional holding ability.

In use, a motorcycle operator places the harness, the rearward section over a passenger, or child, first over the head and with the plate upon the back of the passenger. The operator tightens the straps of the rearward section upon the child or passenger. The child then grasps the forward section of the harness while the operator then seats the child upon the motorcycle, or other vehicle. The operator then seats himself or herself upon the motorcycle and dons the forward portion of the straps, first over the shoulders then across the chest and back towards the passenger. The operator then tightens the straps of the forward portion. Both the operator and the passenger then don their helmets.

From the aforementioned description, a two person vehicle safety restraint has been described. The two person vehicle safety restraint is uniquely capable of fastening upon two people seated one behind the other thus freeing the hands of the rearward person. The straps are preferably made from nylon for strength, flexibility, and durability. The two person safety restraint and its various components may be manufactured from many materials as suggested above, including but not limited to, polymers, polyvinyl chloride, high density polyethylene, polypropylene, nylon, steel, ferrous and non-ferrous metals, their alloys, and composites.

As such, those skilled in the art will appreciate that the conception, upon which this disclosure is based, may readily be utilized as a basis for the designing of other structures, methods and systems for carrying out the several purposes of the present invention. Therefore, the claims include such equivalent constructions insofar as they do not depart from the spirit and the scope of the present invention.

I claim:

1. A device for restraining two persons seated one behind the other, comprising:

a flexible, flat spreader, said spreader having two spaced apart second pads and two spaced apart third pads opposite said second pads, said second pads and said third pads extending outwardly from said spreader wherein said spreader, said second pads, and said third pads forming in combination an x like shape;

a first strap entering said spreader from one of said second pads through the opposite one of said third pads;

a second strap entering said spreader from the other of said second pads through the opposite other of said third pads;

a third strap entering through one of said second pads, proceeding through the one of said second pads beneath said first strap, and through the opposite one of said third pads beneath said first strap;

a fourth strap entering through the other of said second pads, proceeding through the other of said second pads beneath said second strap, and through the opposite one of said third pads beneath said second strap;

said first strap having a first female receptacle outwardly from one of said second pads and a first male tip opposite said first female receptacle, said first male tip outwardly from one of said third pads wherein said first female receptacle and said first male tip mutually connect into a first buckle;

said second strap having another first female receptacle outwardly from one of said second pads and another first male tip opposite said first female receptacle, said first male tip outwardly from one of said third pads wherein said another first female receptacle and said another first male tip mutually connect into another first buckle;

said third strap having a second female receptacle outwardly from one of said second pads and a second male tip opposite said second female receptacle, said second male tip outwardly from one of said third pads wherein said second female receptacle and said second male tip mutually connect into a second buckle;

said fourth strap having another second female receptacle outwardly from one of said second pads and another second male tip opposite said another second female receptacle, said another second male tip outwardly from one of said third pads wherein said another second female receptacle and said another second male tip mutually connect into another second buckle;

said first female buckles cooperating with said first strap and said second strap as a forward portion of said device;

said second female buckles upon said third strap and said fourth strap cooperating with said spreader as a rearward portion of said device; and wherein said forward portion is adapted to fit upon and secure a first person to said device and said rearward portion is adapted to fit upon and secure a second person to said device and snugly behind the first person.

2. The two person restraining device of claim 1 further comprising:

each of said first male tips fitting solely into each of said first female receptacles; and each of said second male tips fitting solely into each of said second female receptacles.

3. The two person restraining device of claim 2 further comprising:

said first strap being adjustable in length proximate at least one of said first female receptacle and said first male tip;

said second strap being adjustable in length proximate at least one of said other first female receptacle and said other first male tip;

said third strap being adjustable in length proximate one of said second female receptacle and said second male tip; and said fourth strap being adjustable in length proximate one of said second female receptacle and the other of said second male tip.

4. The two person restraining device of claim 3 further comprising:

said first strap being adjustable in length proximate said first female receptacle and said first male tip;

said second strap being adjustable in length proximate said other first female receptacle and said other first male tip;

said third strap being adjustable in length proximate said second male tip; and said fourth strap being adjustable in length proximate the other of said second male tip.

5. The two person restraining device of claim 4 further comprising:

said first strap having two adjustors;

said second strap having two adjustors;

said third strap having one adjustor;

said fourth strap having one adjustor; and wherein said adjustors frictionally engage their related strap.

6. The two person restraining device of claim 4 further comprising:

said first strap having a first pad placed between said first female buckle and said spreader;

said second strap having another first pad placed between said other first female buckle and said spreader; and wherein said first pads is adapted to provide comfort to the first person wearing said device.

7. The two person restraining device of claim 5 further comprising:
each of said first strap, said second strap, said third strap, and said fourth strap have a thickness, a width at least eight times the thickness, and a length at least fifteen times the width;
said spreader having a backer, each of said second pads extending a portion of their lengths along the backer, each of said third pads extending their entire length along the backer; and
said spreader having a central portion exposing solely said backer.

8. The two person restraining device of claim 5 further comprising:
a plate having a plurality of slots therethrough, said plurality of slots receiving at least said first strap and said second strap in frictional engagement;
said spreader having a backer and a central portion exposing solely said backer; and
said plate fitting upon said central portion.

9. The two person restraining device of claim 8 further comprising:
said plurality of slots further receiving said third strap and said fourth strap in frictional engagement.

10. A device for restraining two persons seated one behind the other, comprising:
a first strap and a second strap;
a third strap and a fourth strap;
a plate having a plurality of slots therethrough, said plurality of slots receiving at least said first strap and said second strap in frictional engagement;
said first strap having a first female receptacle and a first male tip opposite said first female receptacle, wherein said first female receptacle and said first male tip mutually connect into a first buckle;
said second strap having another first female receptacle and another first male tip opposite said first female receptacle, wherein said another first female receptacle and said another first male tip mutually connect into a another first buckle;
said third strap having a second female receptacle and a second male tip opposite said second female receptacle, wherein said second female receptacle and said second male tip mutually connect into a second buckle;
said fourth strap having another second female receptacle and another second male tip opposite said another second female receptacle, wherein said another second female receptacle and said another second male tip mutually connect into another second buckle;
said first female buckles cooperating with said first strap and said second strap as a forward portion of said device;
said second female buckles upon said third strap and said fourth strap cooperating with said spreader as a rearward portion of said device;
a flexible, flat spreader, said spreader having two spaced apart second pads and two spaced apart third pads opposite said second pads, said second pads and said third pads extending outwardly from said spreader wherein said spreader, said second pads, and said third pads forming in combination an X like shape, having a backer and a central portion exposing solely said backer, and said plate fitting upon said central portion; and
wherein said forward portion is adapted to fit upon and secure a first person to said device and said rearward portion is adapted to fit upon and secure a second person to said device and snugly behind the first person.

11. The two person restraining device of claim 10 further comprising:
said first strap entering said spreader from one of said second pads through the opposite one of said third pads;
said second strap entering said spreader from the other of said second pads through the opposite other of said third pads;
said third strap entering through one of said second pads, proceeding through the one of said second pads beneath said first strap, and through the opposite one of said third pads beneath said first strap;
said fourth strap entering through the other of said second pads, proceeding through the other of said second pads beneath said second strap, and through the opposite one of said third pads beneath said second strap;
said first strap having its first female receptacle outwardly from one of said second pads and its first male tip outwardly from one of said third pads;
said second strap having its first female receptacle outwardly from the other of said second pads and its first male tip outwardly from the other of said third pads;
said third strap having its second female receptacle outwardly from one of said second pads and its second male tip outwardly from one of said third pads; and
said fourth strap having its second female receptacle outwardly from the other of said second pads and its second male tip outwardly from the other of said third pads.

12. The two person restraining device of claim 11 further comprising:
each of said first male tips fitting solely into each of said first female receptacles; and
each of said second male tips fitting solely into each of said second female receptacles.

13. The two person restraining device of claim 12 further comprising:
said first strap being adjustable in length proximate at least one of said first female receptacle and said first male tip;
said second strap being adjustable in length proximate at least one of said other first female receptacle and said other first male tip;
said third strap being adjustable in length proximate one of said second female receptacle and said second male tip; and
said fourth strap being adjustable in length proximate one of said second female receptacle and the other of said second male tip.

14. The two person restraining device of claim 13 further comprising:
said first strap being adjustable in length proximate said first female receptacle and said first male tip;
said second strap being adjustable in length proximate said other first female receptacle and said other first male tip;
said third strap being adjustable in length proximate said second male tip; and
said fourth strap being adjustable in length proximate the other of said second male tip.

15. The two person restraining device of claim 14 further comprising:

said first strap having two adjustors;

said second strap having two adjustors;

said third strap having one adjustor;

said fourth strap having one adjustor; and wherein said adjustors frictionally engage their related strap.

16. The two person restraining device of claim 15 further comprising:

said first strap having a first pad placed between said first female buckle and said spreader;

said second strap having another first pad placed between said other first female buckle and said spreader; and wherein said first pads is adapted to provide comfort to the first person wearing said device.

17. The two person restraining device of claim 16 further comprising:

each of said first strap, said second strap, said third strap, and said fourth strap have a thickness, a width at least eight times the thickness, and a length at least fifteen times the width;

said spreader having a backer, each of said second pads extending a portion of their lengths along the backer, each of said third pads extending their entire length along the backer; and said plurality of slots further receiving said third strap and said fourth strap in frictional engagement.

18. A device for restraining two persons seated one behind the other, comprising:

a flexible, flat spreader, said spreader having two spaced apart second pads and two spaced apart third pads opposite said second pads, said second pads and said third pads extending outwardly from said spreader wherein said spreader, said second pads, and said third pads forming in combination an x like shape;

a first strap entering said spreader from one of said second pads through the opposite one of said third pads;

a second strap entering said spreader from the other of said second pads through the opposite other of said third pads;

a third strap entering through one of said second pads, proceeding through the one of said second pads beneath said first strap, and through the opposite one of said third pads beneath said first strap;

a fourth strap entering through the other of said second pads, proceeding through the other of said second pads beneath said second strap, and through the opposite one of said third pads beneath said second strap;

said first strap having a first female receptacle outwardly from one of said second pads and a first male tip opposite said first female receptacle, said first male tip outwardly from one of said third pads wherein said first female receptacle and said first male tip mutually connect into a first buckle;

said second strap having another first female receptacle outwardly from one of said second pads and another first male tip opposite said first female receptacle, said first male tip outwardly from one of said third pads wherein said another first female receptacle and said another first male tip mutually connect into another first buckle;

said third strap having a second female receptacle outwardly from one of said second pads and a second male tip opposite said second female receptacle, said second male tip outwardly from one of said third pads wherein said second female receptacle and said second male tip mutually connect into a second buckle;

said fourth strap having another second female receptacle outwardly from one of said second pads and another second male tip opposite said another second female receptacle, said another second male tip outwardly from one of said third pads wherein said another second female receptacle and said another second male tip mutually connect into another second buckle;

said first female buckles cooperating with said first strap and said second strap as a forward portion of said device;

said second female buckles upon said third strap and said fourth strap cooperating with said spreader as a rearward portion of said device;

wherein said forward portion is adapted to fit upon and secure a first person to said device and said rearward portion is adapted to fit upon and secure a second person to said device and snugly behind the first person;

each of said first male tips fitting solely into each of said first female receptacles;

each of said second male tips fitting solely into each of said second female receptacles;

said first strap being adjustable in length proximate said first female receptacle and said first male tip;

said second strap being adjustable in length proximate said other first female receptacle and said other first male tip;

said third strap being adjustable in length proximate said second male tip;

said fourth strap being adjustable in length proximate the other of said second male tip;

said spreader having a backer, each of said second pads extending a portion of their lengths along the backer, each of said third pads extending their entire length along the backer;

said spreader having a central portion exposing solely said backer;

a plate having a plurality of slots therethrough, said plurality of slots receiving at least said first strap and said second strap in frictional engagement;

said spreader having a backer and a central portion exposing solely said backer; and said plate fitting upon said central portion.

19. The two person restraining device of claim 18 further comprising:

said first strap having two adjustors;

said second strap having two adjustors;

said third strap having one adjustor;

said fourth strap having one adjustor;

wherein said adjustors frictionally engage their related strap;

said first strap having a first pad placed between said first female buckle and said spreader;

said second strap having another first pad placed between said other first female buckle and said spreader;

wherein said first pads is adapted to provide comfort to the first person wearing said device;

each of said first strap, said second strap, said third strap, and said fourth strap have a thickness, a width greater than the thickness, and a length greater than the width; and said plurality of slots further receiving said third strap and said fourth strap in frictional engagement.

* * * * *